United States Patent [19]

Asano et al.

[11] Patent Number: 4,867,218
[45] Date of Patent: Sep. 19, 1989

[54] RADIAL TIRE PROFILE

[75] Inventors: Kazuo Asano, Kobe; Masahiro Oku, Osaka; Mitsushige Idei, Kobe; Yoshihide Kojima, Takarazuka, all of Japan

[73] Assignee: Sumitomo Rubber Industries, Ltd., Hyogo, Japan

[21] Appl. No.: 134,759

[22] Filed: Dec. 18, 1987

[30] Foreign Application Priority Data

Dec. 18, 1986 [JP] Japan ................................ 61-303392

[51] Int. Cl.$^4$ ................................................ B60C 3/00
[52] U.S. Cl. ................................... 152/454; 152/546; 152/547
[58] Field of Search .................... 152/454, 209 R, 541, 152/547, 546

[56] References Cited

U.S. PATENT DOCUMENTS

| | | | |
|---|---|---|---|
| 3,068,926 | 12/1962 | Jacob et al. | 152/454 |
| 3,097,681 | 7/1963 | Harkins | 152/454 |
| 4,345,634 | 8/1982 | Giron | 152/454 |
| 4,669,519 | 6/1987 | Togashi et al. | 152/454 |
| 4,721,143 | 1/1988 | Fukushima et al. | 152/454 |

*Primary Examiner*—Michael W. Ball
*Assistant Examiner*—Geoffrey L. Knable
*Attorney, Agent, or Firm*—Birch, Stewart, Kolasch & Birch

[57] ABSTRACT

A radial tire comprises a carcass, a tread thereon, a breaker therebetween, bead cores, and rubber bead apexes, and is characterized in that:

(a) the clip width (C1) is smaller than the rim width (C2) of a normal rim for a tire;

(b) the carcass (6), in a state of the tire mounted on the normal rim and inflated to a standard pressure, has:
  an outwardly bulging outer part (21) between the largest width point (D) and a radially outer second point (E2),
  an outwardly bulging middle part (22) between the largest width point (D) and a inflexion point (F), and
  an inwardly bulging inner part (23) between the inflexion point (F) and a radially inner first point (E1);

(c) the radial height (H2) of the largest width point (D) from the first point (E1) is 50–40% of the height (H1) of the second point (E2);

(d) the axial distance (L1) between the largest width point (D) and a third line (X3) is 28–33% of the height (H1); and (e) the axial distance (L2) between the inflexion point (F) and the third line (X3) is 70–55% of the distance (L1), thereby reducing the total compressive strain in the sidewalls and beads of the tire, and improving the maneuverability and the riding feel in at the same time.

3 Claims, 9 Drawing Sheets

RADIAL TIRE PROFILE

BACKGROUND OF THE INVENTION

The present invention relates to a radial tire, and more particularly to a carcass profile of a radial tire.

In recent years, there are widely used the radial tires provided between the tread and the radial carcass with a strong breaker for stiff reinforcement beneath the tread. In such kind of a tire, because of high rigidity of the breaker, the cornering power is large, the rolling resistance is small, and also the wear resistance is elevated. In general, however, lateral rigidity of the tire sidewalls is low because the carcass cords are arranged radially. Accordingly, maneuverability is also low.

For such a reason, there is presently being used a flat tire the section height of which is made low.

When making the tires flatten to increase the lateral rigidity, however, the radial rigidity of the tire is also increased, as a necessary consequence of which a comfortable ride is hindered by the shock created when riding over uneven road surfaces or projections in the road whereby the shock is transmitted through the sidewalls to the vehicle.

Although the desirable features of maneuverability and riding comfortable are conditions considered to be contradictory and antagonistic to each other, a variety of proposals are being made to satisfy both considerations at the same time.

By way of example, the Japanese Patent Publication, No. 53-42166 of 1978 has proposed to make the position of the largest width of the tire displace toward the tread. On the other hand, Japanese Patent Application disclosure No. 55-110604 of 1980 has proposed to make the position of the largest width approach the bead. Both disclosures assert that it is possible to enhance the comfortable driving feeling by absorbing the shock transmitted from the tread.

Further, in the Japanese Patent Publication No. 61-28521 of 1986, there is emphasized that the rolling resistance can be decreased by bringing the portion of the largest width near the tread, in concurrence with which it becomes possible to immediately secure a comfortable drive and maneuverability. Also a tire of preferable profile can be obtained by making the clip width of the tire-vulcanizing mold larger than the rim width.

Incidentally, the above mentioned clip width corresponds to the axial distance between the outside surface of the one bead and that of the other bead when the tire is in a state that the tire molding has ended, more exactly when the tire is not mounted on a rim. In the tire of the present invention, therefore, we hereinafter refer to the above mentioned axial distance as "clip width".

In addition, Japanese Patent Publication No. 61-28522 of 1986 also makes the proposal that it should be possible to satisfy the comfortable feeling and the maneuverability properties as well on the basis of the same profile as previously used.

Japanese Patent Application Disclosure No. 61-222801 of 1986 insists on being able to improve the driving comfort and feeling through the lowering of the rigidity of the bead apex.

Figure 8:
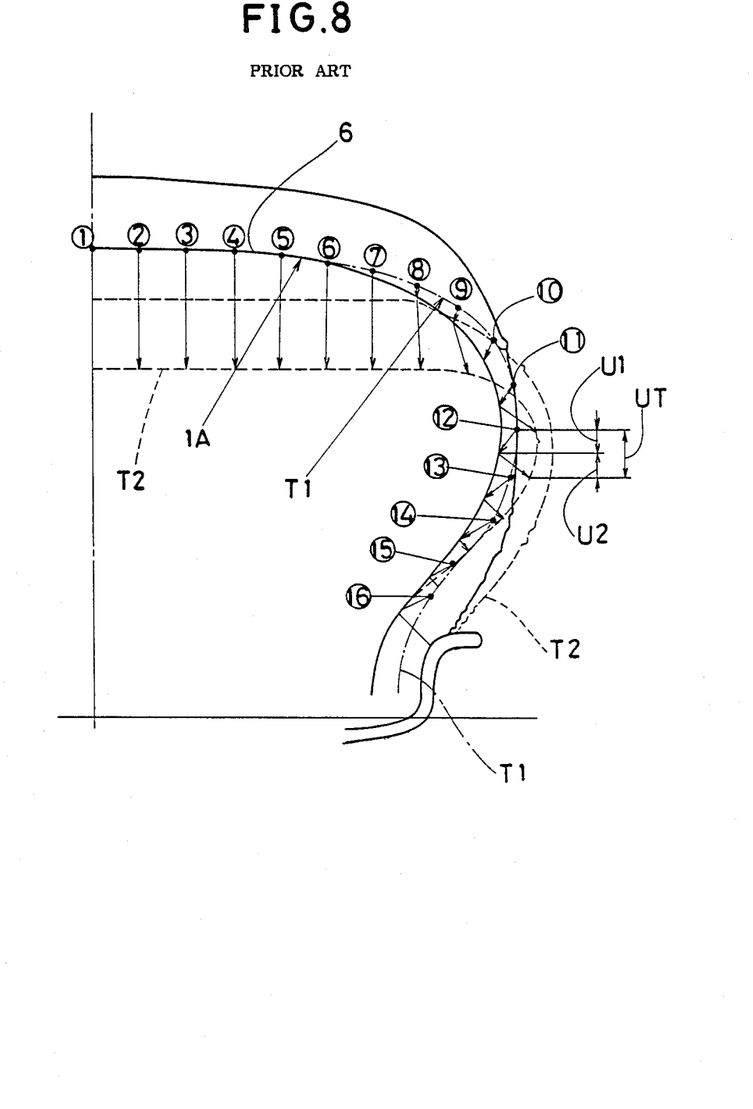
FIG. 8 is a diagram showing the profile change in the prior art tire and the compressive strain produced thereby.

However, in any tire heretofore proposed, the clip width is made equal to the rim width, or else it is done beforehand rather widely, as shown in FIG. 8. When using tires of such a kind, the sidewalls and the beads are subjected to a large compressive strain caused by both mounting on the rim and increasing the tire pressure, and changing the tire profile by tire load, whereby the large compressive strain increases the apparent rigidity of the rubber, that is, of both the sidewalls and the beads. In consequence it is impossible to display the sufficient effect to the improvement of the tire in the point of the comfortable feeling at the time of driving.

SUMMARY OF THE INVENTION

An object of the present invention is therefore, to provide a radial tire wherein the maneuverability is improved while maintaining a comfortable ride.

Another object of the present invention is to provide a carcass profile which reduces the total compressive strain generated in the sidewalls and beads by making the clip width of the tire smaller than the rim width.

According to one aspect of the present invention, the tire of the present invention comprises:

a pair of bead cores disposed in the beads of the tire;

a radial carcass extending across the beads, both ends of which are turned up around the bead cores to form a main part and turned-up parts of the carcass;

a tread disposed on the carcass;

a rubber bead apex, disposed between the main part and the turned-up part of the carcass, and extending taperingly radially outwardly along said carcass;

a breaker, having high tensile cords, and disposed between the carcass and the tread, wherein the tire is characterized in that:

(a) the clip width (C1) of the tire is under 100% and over 85% of the rim width (C2) of a normal rim for the tire;

(b) in a state of the tire mounted on a normal rim and inflated to a standard pressure, said carcass (6) having:

the largest width point (D) between a radially inner first point (E1) and a radially outer second point (E2);

an inflexion point (F) between the largest width point (D) and the radially inner first point (E1);

an outwardly bulging outer part (21) between the largest width point (D) and the radially outer second point (E2);

an outwardly bulging middle part (22) between the largest width point (D) and the inflexion point (F); and an inwardly bulging inner part (23) between the inflexion point (F) and the radially inner first point (E1), wherein the first point (E1) is defined as a point of intersection of the carcass (6) and a second line (X2) that is a perpendicular on a first line (X1) at a contact point (C) at which the first line (X1) being inclined axially outwardly by 45° to the rim base contacts with the axially inside surface of the rim flange (11) of the rim, the second point (E2) is defined as a point of intersection of the carcass and a third line (X3) extending radially outwardly from the first point (E1), and the middle part (22) and the inner part (23) smoothly continue through the inflexion point (F);

(c) a radial height (H2) of the largest width point (D) from the first point (E1) is under 50% and over 40% of a radial height (H1) of the second point (E2) from the first point (E1);

(d) an axial distance (L1) between the largest width point (D) and the third line (X3) is over 28% and under 33% of the height (H1); and (e) an axial distance (L2) between the inflexion point (F) and the third line (X3) is under 70% and over 55% of the distance (L1).

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 9 is a diagram showing the result of a measurement of the correlative shear strain produced at the edges of the breakers 7 and 7a;

DETAILED DESCRIPTION OF THE INVENTION

The description will now be directed to an example of the present invention with reference to the accompanying drawings.

Figure 1:
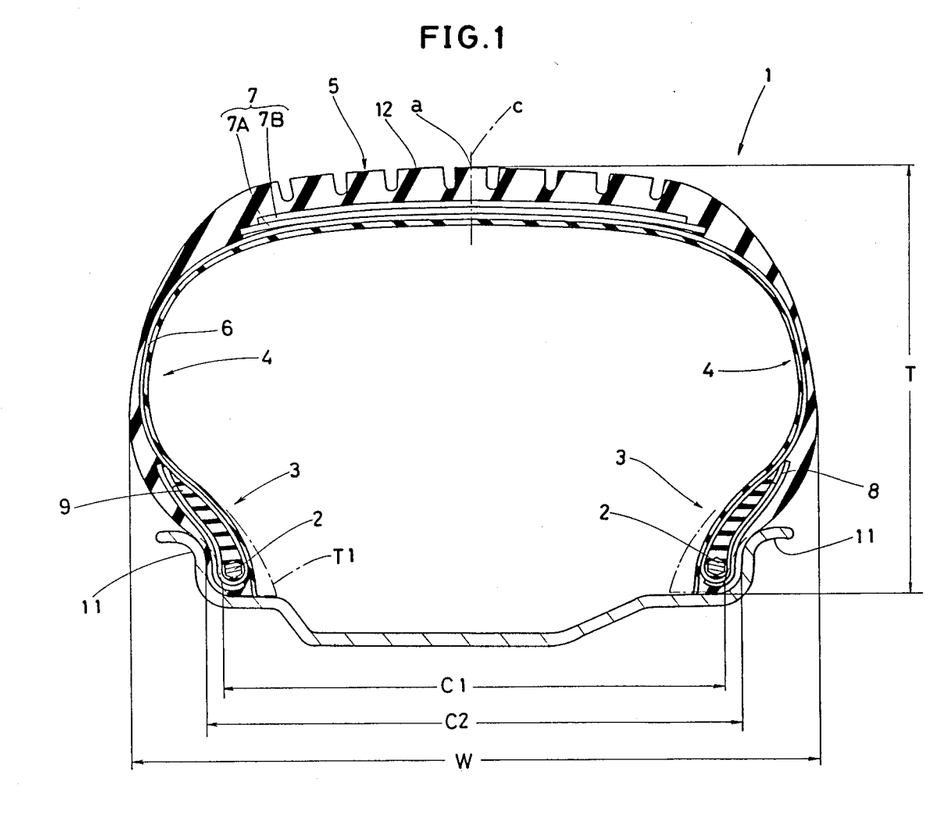
FIG. 1 is a cross sectional view showing an example according to the present invention.

In FIG. 1, a pair of bead cores 2 are disposed in the beads 3 of the tire 1; a carcass 6 extends across the beads 3; the both ends of the carcass 6 are turned up around the bead cores 2 from the axially inside to the outside thereof to form turned-up parts axially outward of the bead cores 2 and a main part therebetween; a tread 5 and sidewalls 4 are provided on the carcass 6; a breaker 7 is disposed between the tread 5 and the carcass 6; and a pair of bead apex 9 are disposed between the main part and the turned-up part of the carcass 6. And the tire 1 is mounted on a normal rim R for the tire by fitting the beads 3 on its bead seats and flanges 11, and inflated to the standard internal pressure.

In this example, the tire 1 is formed as a flat tire of which an aspect ratio is less than 100%, for example, not more than 90%. Incidentally, the aspect ratio is defined as T/W, where T is the tire section height, or the radial distance between the bead base and the highest point (a) of the tread surface 12, and W is the tire section width.

The above-mentioned carcass 6 has 1 to 3 plies of cords laid radially at an angle of about 80° to 90° to the equatorial plane C of the tire. For the cords, there is utilized such materials as nylon, polyester, rayon, aromatic polyamide fiber, or steel.

The above-mentioned breaker 7 has, for example, two plies of parallel cords including a radially inner first ply 7A and a radially outer second ply 7B. The cords of each ply are made of metal such as steel, and arranged at a relatively small angle to the equatorial plane C of the tire in inverse direction with others. Further, the radially inner first ply 7A is larger than the second ply 7A in axial width, and the both ends thereof extend up the tread ends.

The rubber of the bead apex in this example, is in a range of 90° to 95° in Shore (A) hardness, and the radial height H3 of the radially outer end of the bead apex from the first point E1 is over 40% and under 60% of the height H1, wherefore the rigidity of the beads 3 are increased, and it is possible to prevent excessive deformation of the beads 3 caused by inflation and tire load.

Further, in this example, each bead 3 is provided with a reinforcing layer 8 for reinforcing the bead. The layer is disposed axially outside the carcass turned-up part, and extends radially outwardly beyond the radially outer end of the bead apex 9 from a portion radially inward of the bead core 2. Incidentally, this reinforcing layer 8 comprises at least one ply of cords made of suitable material such as metallic or organic fibers or filament.

As mentioned above, the present invention intends to mitigate the total compressive strain $\epsilon T$ generated in the sidewalls 4 and the beads 3 to improve the comfortable driving feeling, and further intends to provide circumferential tensile strain on the edge parts of the breaker 7 to maintain the maneuverability, at the same time.

In the present invention, the above mentioned total compressive strain $\epsilon T$ means the sum of the compressive strain $\epsilon 1$ generated by a change from a state where the tire (T1) is not mounted on the rim to a state that the tire (1) is mounted on the normal rim R and inflated to a standard internal pressure, and the compressive strain $\epsilon 2$ due to the tire load during running.

As can be understood from the above-mentioned situation, it is necessary first of all to decrease the above-mentioned compressive strain $\epsilon 1$ in the total compressive strain $\epsilon T$.

To this end, in the radial tire of the present invention, the clip width C1 is set to be smaller than the rim width C2 of the normal rim R, but larger than 0.85 times the rim width, as shown in FIG. 1, wherein there are shown by chain line the beads of the tire T1 in the state after the tire vulcanizing molding has ended.

Figure 2:
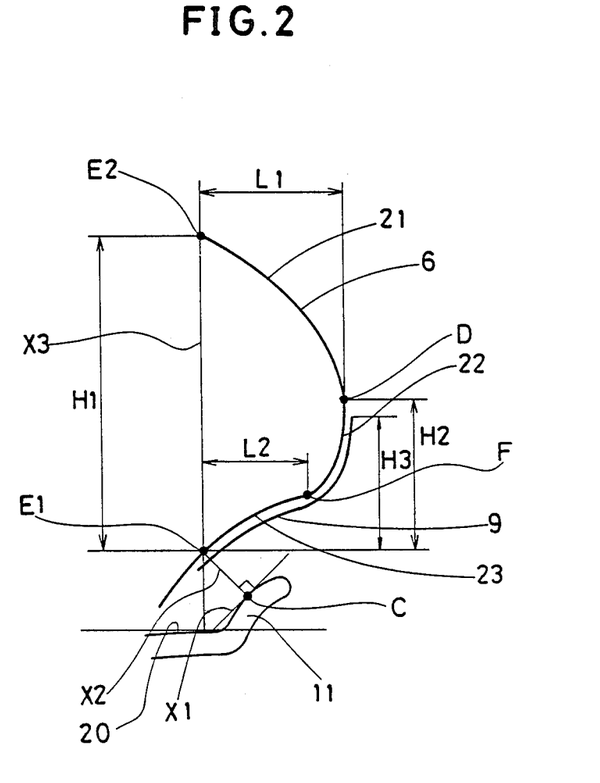
FIG. 2 is a diagram showing the profile of the carcass thereof.

Further, as shown in FIG. 2, in a state of the tire inflated to the standard pressure, the sectionally largest width point D of the carcass 6 lies between a radially inner first point E1 and a radially outer second point E2, wherein the first point E1 is defined as a point of intersection of the carcass 6 and a second line X2, the second line X2 is a perpendicular on a first line X1 (which is inclined axially outwardly by 45° to the rim base 20) at a contact point C at which the first line X1 contacts with the rim flange 11 of the rim R; and the second point E2 is defined as a point of intersection of the carcass 6 and a third line X3 which extends radially outwardly from the first point E1. Further, the carcass 6 has an inflexion point F between the largest width point D and the first point E1. And the outer part 21 between the largest width point D and the second point E2 bulges outwardly; also the middle part 22 between the largest width point D and the inflexion point F bulges outwardly; on the contrary the inner part 23 between the inflexion point F and the first point E1 bulges inwardly; and the outer part 21, the middle part 22, and the inner part 23 smoothly continue through the points D and F; further the outer part 21 and a part between the second points E2 smoothly continue through the points E2 so that the radius of curvature of the carcass 6 in the tire shoulder parts become large. Thus when the tire internal pressure is increased from 5% to 100% of the standard pressure, said outer part between the second point (E2) and the largest width point (D) moves outwardly, while said middle and inner parts have portions which move inwardly.

In addition to the above, in the radial tire of the present invention, a radial height H2 of the largest width point D from the first point E1 is under 50% and over 40% of a radial height H1 of the second point E2 from the first point E1; an axial distance L1 between the largest width point D and the third line X3 is over 28% and and under 33% of the height H1; and an axial distance L2 between the inflexion point F and the third line X3 is under 70% and over 55% of the distance L1.

As a general rule, the above mentioned outer part 21 is small in rubber gauge, and is minor in the bending and shearing rigidity. For that part, therefore, there is used a curved form similar to what is called a natural equilibrium form well-known to one skilled in the art.

Accordingly, the profile of the carcass 6 after molding approximates that of the carcass when loaded, and further when the tire is mounted on the rim R and inflated to the standard internal pressure, the cross section thereof takes a form of bulging in the lower part.

On the top of that, the height H2 of the largest width point D is set to be not more than 50% of the height H1 of the second point E2; the distance L2 of the inflexion point F is made larger than 55% of the distance L1 of the largest width point D; and what is more, the distance L1 is set to be not less than 28% of the height H1, thereby increasing the radius of curvature of the outer part 21 of the carcass 6, and also enhancing the flexibility of the radially outer part of the sidewall 4.

Further, as mentioned above, the carcass 6 has the outer part 21, the middle part 22, and the inner part 23 smoothly continuing through the points D and F; and further the outer part 21 and a part between the second points E2 smoothly continue through the points E2, thereby the radius of curvature of the carcass 6 in the tire shoulder parts becomes large. Accordingly, the tire 1 when loaded, is easy to deform the radial direction while increasing the zone of the carcass 6 parallel to the grounding face, whereby the impact acting on the tread 5 is absorbed. As a result, the drive comfort is enhanced. By the way, in conventional tires, the radius of curvature in the shoulder parts is small, whereby the grounding area is not increased very much, and accordingly they are generally inferior to the tire of the present invention in buffering function.

By the way, when the height H2 is less than 40% of the height H1 and/or when the distance L2 is more than 70% of the distance L1, it becomes necessary to make the clip width C1 excessively small. Such a situation is not desirable because of a lowering in the efficiency of the production of the tire.

In addition, when the distance L1 is over 33% of the height H1, then the lateral rigidity of the type is lowered to the greatest degree, thereby hindering the maneuverability.

Comparative tests were done on the test tires of 185/60R14 having the construction shown in FIG. 1 and the particulars listed in Table 1. The example tire of the present invention has the carcass profile shown in FIG. 3, and the comparative example has the

TABLE 1

|  | Example of Invention | Comparative Example |
|---|---|---|
| Carcass |  |  |
| cord material | polyester | polyester |
| number of plies | 2 | 2 |
| Breaker |  |  |
| code material | steel | steel |
| number of plies | 2 | 2 |
| intersection angle | 22° | 22° |
| Bead apex hardness of rubber | 93° | 93° |
| Ratio (C1/C2) of clip width C1 to rim width C2 | 0.86 | 1.10 |
| H2/H1 | 0.47 | 0.55 |
| L1/H1 | 0.30 | 0.32 |
| L2/H1 | 0.63 | 0.53 |
| H3/H1 | 0.49 | 0.50 |
| Feeling in the ride | 110 | 100 |

Figure 3:
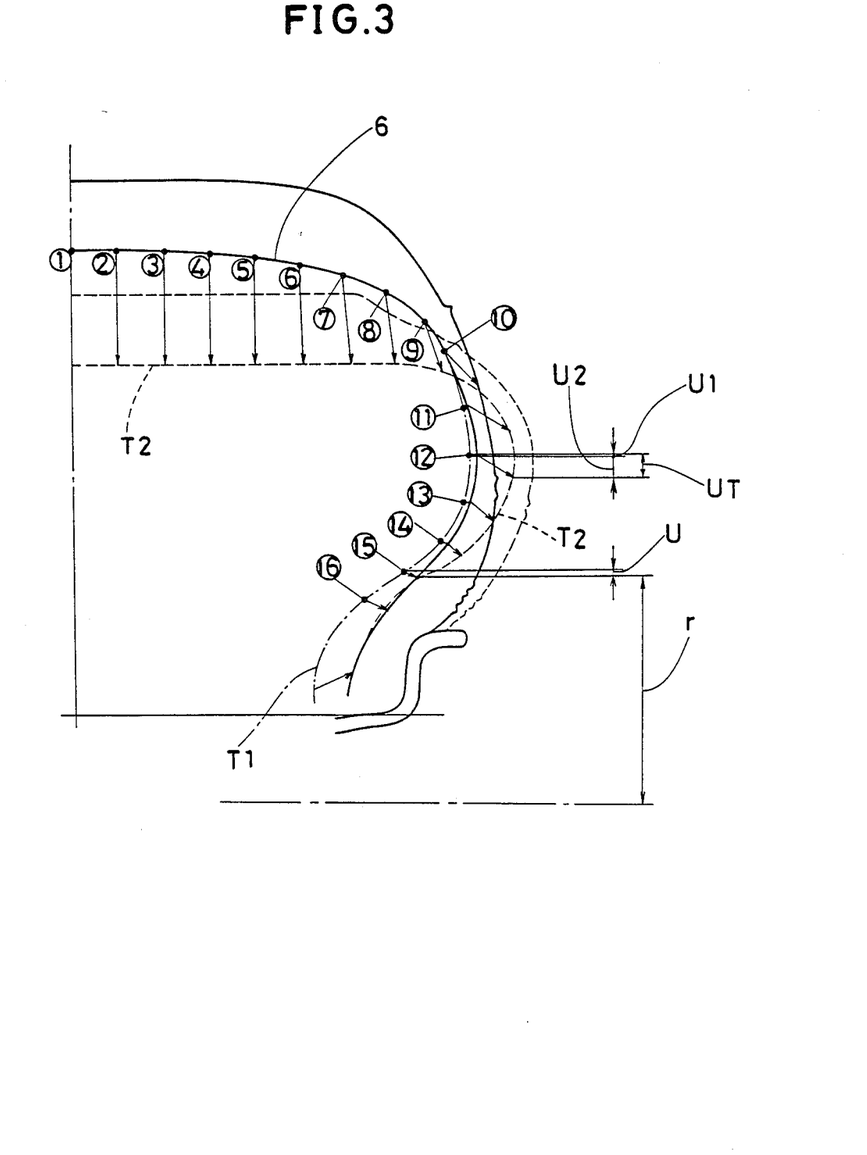
FIG. 3 is a diagram showing the profile change in the example of the present invention and the compressive strain produced thereby.
Figure 4:
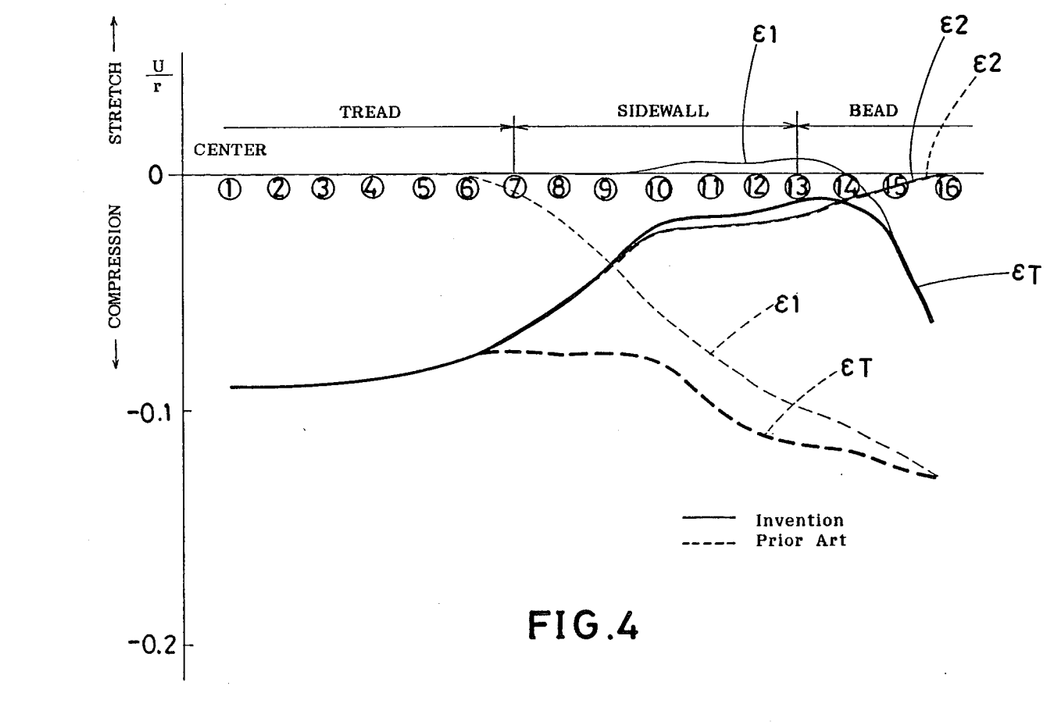
FIG. 4 is a diagram showing the compressive strain thereof in comparison with that of a prior art tire.

There are shown in FIG. 3 the above-mentioned compressive strain $\epsilon 1$ due to the tire mounting and inflation and the compressive strain $\epsilon 2$ due to the tire load, and the total compressive strain $\epsilon T$ in the tire 1 of the present invention. On the other hand, those in a conventional tire 1A are shown in FIG. 8, wherein the clip width thereof is set larger than the rim width. FIG. 4 shows those strains in both the present invention and in convention tires.

By the way, in FIGS. 3 and 8, the profile T1 of the carcass 6 in the state that the tire is free, that is, not yet mounted on the rim, is illustrated by a chain line; the tire in the state that it is mounted on the rim and inflated to the standard internal pressure, is illustrated by full line, and the line referred to by the reference 6 shows the profile of the carcass; and the tire in a loaded state is illustrated by broken line, and the line reffered to by the reference T2 shows the profile of the carcass 6. Further, in FIGS. 3, 4 and 8, 1 – 16 show corresponding positions on the carcasses 6 of the respective tires 1 and 1A; and the starting points of the arrows indicate the respective positions before the deformation, and the pointed ends of the arrows indicate the respective positions after the deformation. Further, in FIGS. 3 and 8, the arrow from the chain line to the full line exhibit the vector of the deformation due to the tire mounting and inflation, and the arrow from the full line to the broken line exhibits the vector of the deformation due to tire load.

The above mentioned compressive strain ($\epsilon 1$, $\epsilon 2$, $\epsilon T$) is defined as a ratio of the radial component (U1, U2, UT) of the vector to the radius (r) at the position where the deformation has taken place.

As understood clearly from the contradistinction of FIGS. 3, 4 and 8, at any and every positions 7 to 16 the radial components U1 in the tire 1 of the invention are smaller than those in the conventional tire 1A. And the radial component U2 of the vector of the deformation due to tire load makes no great difference in either case. Consequently, the total UT as the sum of the component U1 and component U2, that is, the total compressive strain $\epsilon T$ especially in the shoulder part of the tire and the bead part is remarkably decreased in the case of the tire of the present invention as compared with the conventional tire.

As the result, the apparent rigidity of the sidewalls and beads are lowered, whereby the driving feel is improved.

Further, as apparent from the figures, between the positions 9 and 14, those positions of the tire 1 of the invention move radially outwardly as the internal pressure is increased, and tensile strain is occurred within the range. On the contrary, in the conventional tire 1A compressive strain grows remarkably large. This means that the tensile force acts on the edge parts of the breaker 7, as shown in FIG. 7, by virtue of the internal pressure, while, in conventional tires, the tensile force of nearly the same value acting on the breaker layer 7a, as shown in FIG. 6, and further, the breaker plies (7A, 7B) are pressed against each other to elevate the hoop effect thereof.

Therefore, the breaker 7 at the fringe parts is increased in Young's modulus, and the apparent rigidity thereof is also increased. As the result, the cornering power is increased, and the maneuverability is maintained or elevated.

Further, the increase of the apparent rigidity at the edge part, contributes to a decrease in the shear strain between the breaker plies, and to a decrease of the amplitude of the strain varying while running under such a loaded state. And the decrease of the amplitude lowers the calorific power of the breaker 7, and reduces the rolling resistance, and at the same time, is able to contribute even to the prevention of damage of the fringe part of the breaker 7.

Figure 6:
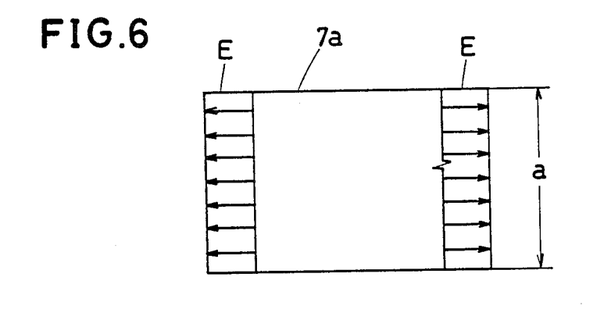
FIG. 6 is a diagram illustrating the tensile force E acting on the breaker 7a of a conventional tire.
Figure 7:
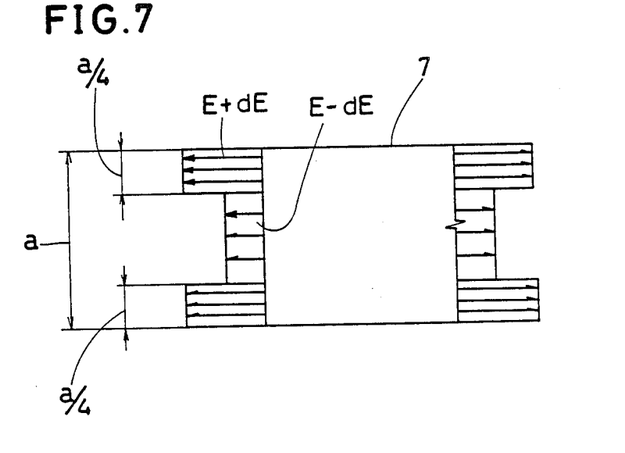
FIG. 7 is a diagram showing the tensile force acting on the breaker 7 of the example of the present invention.

Incidentally, in the case of FIGS. 6 and 7, illustrated on an assumption that the increase in Young's modulus would occurred on the 25% width parts on the breaker edges, the bending rigidity D1 and D2 of the Breaker 7a and 7 in the circumferential direction of the tire, is given as follows:

$$D1 = a^3 hE/12$$

$$D2 = a^3 hE/12 + a^3 hdE/16$$

wherein
E: Young's modulus
dE: increase in Young's modulus
a: width of breaker
h: thickness of breaker

SUMMARY

The total compressive strain $\epsilon T$ is shown in FIGS. 3, 4 and 8, as mentioned above. From what has been shown, it will be apparent that the tire of the present invention is remarkably decreased in total compressive strain $\epsilon T$.

Figure 9:
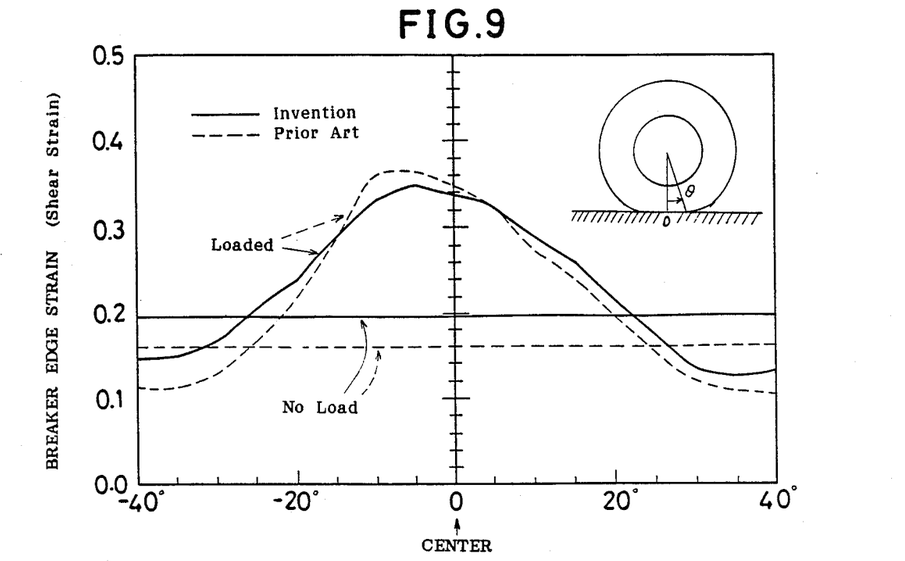

The shear strain between the first and second breaker plies at its edge parts is shown in FIG. 9, wherein the strain $\gamma$ is noted on the ordinate and the circumferential position thereof as the angle $\theta$ to the grounding center is noted on the abscissa. The shear strain $\gamma$, when the tire is inflated amounts to 0.193 in this example (shown by full line), whereas in contrast, the comparative example presents a shear strain of only 0.160. From this, it follows that in this example, the amount of strain at the edge part is increased as mentioned above. Also as to the amplitude of the strain, the present example is 0.224, as compared with that of the comparative example which is 0.266. Seeing this, it will be apparent that it is possible for our example to diminish the amplitude of the strain, that is, heat generation and to lessen the damages such as, for example, breaker ply separation.

Figure 10:
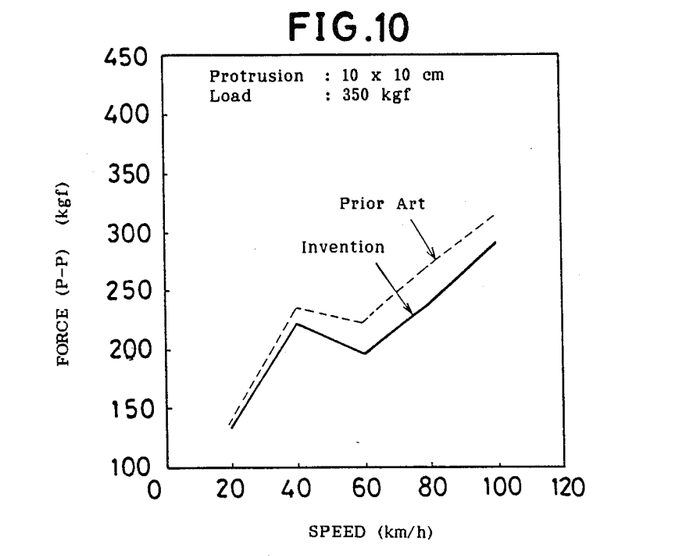
FIG. 10 is a diagram showing comparative results of the ride over protrusion tests.

Further, there is shown in FIG. 10 the impact force caused at the time of the riding over protrusions in the road. It will be clear at once that this example can mitigate the impact as compared with the comparative example.

Figure 11:
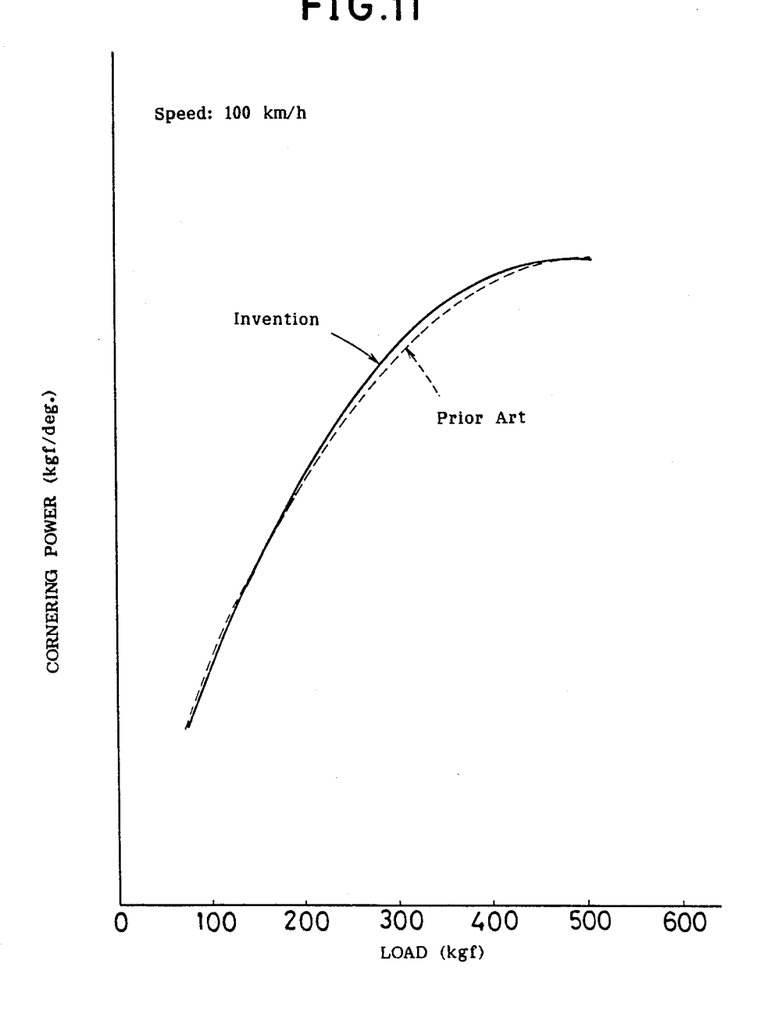
FIG. 11 is a diagram showing comparatively showing the results of measurements of the respective cornering power.

Further, there is shown in FIG. 11 the cornering power at 100 km/h. Needless to say, the present example is superior to the comparative example.

In addition, Table 1 reports the results of the feeling test for ride comfort using a test car. The results are expressed by an index treating the comparative tire as 100. Therefore, the larger the index, the more advantageous is the ride comfort. Accordingly, this example is more pleasant in ride comfort when compared with conventional comparative example tires.

In this way, the radial tire according to the present invention, the foundation of which is formed by making the clip width smaller than the rim width, is able to reduce the total compressive strain of the tire and to improve the maneuverability and the feeling of the ride at the same time.

Figure 5:
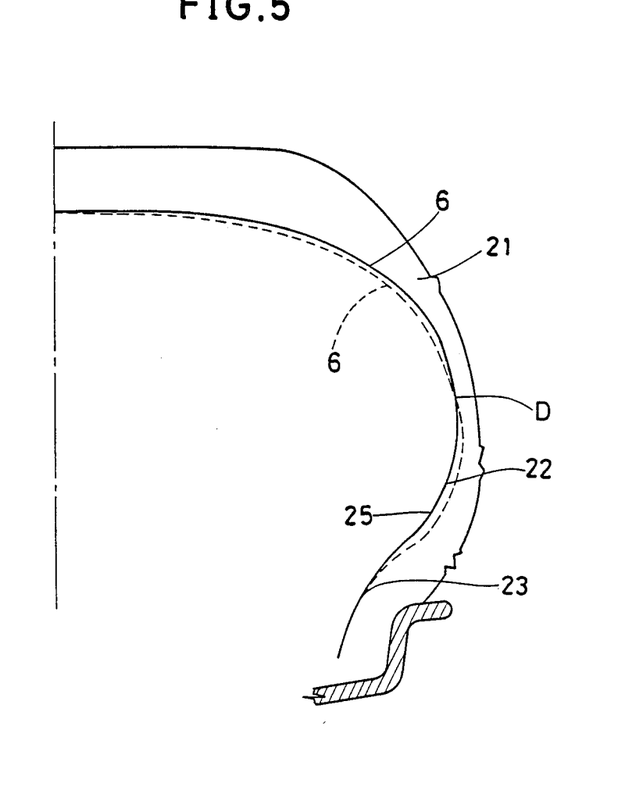
FIG. 5 is a diagram showing another example.

Incidentally, as shown in FIG. 5, in the present invention, the outer part 21 of the carcass can be set to move further outward in comparison with the above mentioned example, and not only that, moving part 25 inward can be provided within the range of the middle part 22 and the inner part 23. Thereby it is possible for the radial tire of the present invention to enhance the hoop effect at the edge parts of the breaker, and simultaneously to fulfill the improvement of the driving feel.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim:
1. A radial tire comprising:
a pair of bead cores disposed in the beads of the tire;
a radial carcass extending across the beads, both ends of which are turned up around the bead cores to form a main part and turned-up parts of the carcass;
a tread disposed on the carcass;
a rubber bead apex disposed between the main part and the turned-up part of the carcass, and extending taperingly radially outwardly along said carcass;
a breaker, having high tensile cords, and disposed between the carcass and the tread; characterized in that:
(a) the clip width (C1) of the tire after the vulcanizing molding is under 100% and over 85% of the rim width (C2) of a normal rim for the tire;
(b) in a state of the tire mounted on a normal rim and inflated to a standard pressure, said carcass (6) having:
the largest width point (D) between a radially inner first point (E1) and a radially outer second point (E2);
an inflexion point (F) between the largest width point (D) and the radially inner first point (E1);
an outwardly bulging outer part (21) between the largest width point (D) and the radially outer second point (E2);
an outwardly bulging middle part (22) between the largest width point (D) and the inflexion point (F); and an inwardly bulging inner part (23) between the inflexion point (F) and the radially inner first point (E1), wherein the first point (E1) is defined as a point of intersection of the carcass (6) and a second line (X2) that is a perpendicular to a first line (X1) at a contact point (C) at which the first line (X1) inclined axially outwardly by 45° to the rim base contacts with the axially inside surface of the rim flange (11), and the second point (E2) is defined as a point of intersection of the carcass and a third line (X3) extending radially outwardly from the first point (E1); and the middle part (22) and the inner part (23) smoothly continue through the inflexion point (F);

(c) a radial height (H2) of the largest width point (D) from the first point (E1) is under 50% and over 40% of a radial height (H1) of the second point (E2) from the first point (E1);

(d) an axial distance (L1) between the largest width point (D) and the third line (X3) is over 28% and under 33% of the height (H1); and (e) an axial distance (L2) between the inflexion point (F) and the third line (X3) is under 70% and over 55% of the distance (L1).

2. The tire of claim 1 wherein the Shore A hardness of said rubber bead apex is in a range of 90° to 95° and a radial height (H3) of the radially outer end of said bead apex from the first point (E1) is over 40% and under 60% of the height (H1).

3. The tire of claim 2 wherein when the tire internal pressure is increased from 5% to 100% of the standard pressure, said outer part between the second point (E2) and the largest width point (D) moves outwardly, while said middle and inner parts have portions which move inwardly.

* * * * *